United States Patent
Gruss et al.

(10) Patent No.: US 8,672,398 B2
(45) Date of Patent: Mar. 18, 2014

(54) IN-LINE OUTER SLIDING PANORAMA SUNROOF TRACKS

(71) Applicant: Tesla Motors, Inc., Palo Alto, CA (US)

(72) Inventors: Matthew Paul Gruss, San Francisco, CA (US); Marcus Christensen, Davisburg, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/628,980

(22) Filed: Sep. 27, 2012

(65) Prior Publication Data

US 2013/0082487 A1    Apr. 4, 2013

Related U.S. Application Data

(60) Provisional application No. 61/540,557, filed on Sep. 29, 2011.

(51) Int. Cl.
*B60J 7/043* (2006.01)
*B60J 10/12* (2006.01)

(52) U.S. Cl.
USPC ............. 296/216.04; 296/216.06; 296/216.05

(58) Field of Classification Search
USPC .............................................. 296/216.01–224
See application file for complete search history.

(56) References Cited

U.S. PATENT DOCUMENTS

| | | | |
|---|---|---|---|
| 5,335,961 A * | 8/1994 | Reinsch et al. | 296/213 |
| 5,899,524 A * | 5/1999 | Mori et al. | 296/222 |
| 2010/0038932 A1 * | 2/2010 | Comfort et al. | 296/216.08 |
| 2010/0045075 A1 * | 2/2010 | Mack et al. | 296/215 |

* cited by examiner

*Primary Examiner* — Dennis Pedder
(74) *Attorney, Agent, or Firm* — J. Richard Soderberg

(57) ABSTRACT

Continuous cross sectional profile guide tracks in an outer sliding sunroof/moonroof are provided where both the front and rear mechanism or mechanism links travel fore/aft in the same channels as each other and have fore/aft travel that is limited only by vehicle architecture. The guide track channel is partly or entirely outside/outboard of the primary water/wind sealing system of the sunroof.

4 Claims, 6 Drawing Sheets

IN-LINE OUTER SLIDING PANORAMA SUNROOF TRACKS

CROSS REFERENCE TO RELATED APPLICATIONS

This Application claims the benefit of U.S. Provisional Application 61/540,557 filed on Sep. 29, 2011, the contents of which are expressly incorporated by reference thereto in its entirety for all purposes.

This application is related to the following co-pending US applications, all filed on the same date as the present application: U.S. patent application Ser. No. 13/629,169 which claims benefit of U.S. Provisional Application 61/540,648 titled "Cam Mechanism Integrated Into Structural Sunroof Framework" and filed on Sep. 29, 2011; U.S. patent application Ser. No. 13/629,238 which claims benefit of U.S. Provisional Application 61/540,758 titled "Sunroof Mechanism Linkage with Continuous One Part Guide Track" and filed on Sep. 29, 2011; U.S. patent application Ser. No. 13/629,248 which claims benefit of U.S. Provisional Application 61/540,930 titled "Sunroof Utilizing Two Independent Motors" and filed on Sep. 29, 2011; and U.S. patent application Ser. No. 13/629,392 which claims benefit of U.S. Provisional Application 61/541,021 titled "Sunroof Positioning and Timing Elements" and filed on Sep. 29, 2011, the contents of all these non-provisional and provisional applications are all hereby expressly incorporated by reference thereto in their entireties for all purposes.

BACKGROUND OF THE INVENTION

The present invention relates generally to passenger compartments, and more specifically, but not exclusively, to a moveable roof track assembly of a passenger vehicle.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Outer sliding panels (also commonly referred to as sunroofs, moonroofs, panorama roofs, panoramic roofs and other trade names herein referred to generically as a sunroof) are sunroofs where a movable panel (made of glass, sheet metal, metal reinforcements, polycarbonate or a combination of these or similar materials), from its closed position, lifts or tilts and then moves into a position above a fixed panel where it effectively provides an opening in the roof to the outside air. This can give occupants the feel of openness towards the sky similar to a retracted convertible top. The larger the open air opening ("hands through opening") and the larger the transparent opening when the moving panel is closed ("day light opening") the more value is gained regarding this feeling.

Typical outer sliding sunroof designs use two sets of guide tracks with independent mechanism guide channels in different cross-car positions (Y) or a single guide track but through machining operations the mechanism guide channels are effectively independent of one another concerning their positions in the cross-car (Y) direction. The forward guide track channel and mechanism components are normally contained inside of the wind/water sealing system. As such, the fore/aft travel of the moving panel is restricted to be within the perimeter of that sealing system.

What is needed is a system and method for improving sunroof implementations to increase hands through opening and day light opening characteristics.

BRIEF SUMMARY OF THE INVENTION

Disclosed is a system and method for improving sunroof implementations to increase "hands through opening" and "day light opening" characteristics.

The following summary of the invention is provided to facilitate an understanding of some of technical features related to sunroof implementations, and is not intended to be a full description of the present invention. A full appreciation of the various aspects of the invention can be gained by taking the entire specification, claims, drawings, and abstract as a whole. The present invention is applicable to other passenger compartments.

A moveable panel system for a roof of a passenger compartment of a vehicle includes a roof wall of the vehicle having a first lateral edge and a second lateral edge with the roof wall defining an opening between the lateral edges, the opening having a width between the lateral edges and a length between a front edge of the roof wall and a rear edge of the roof wall; a structural cross bow provided in the roof wall perpendicular to the lateral edges and proximate a rear edge of the opening; a pair of continuous unitary parallel tracks disposed in the roof wall and longitudinally extending from the front edge towards the rear edge with the tracks outside a perimeter of the opening and outside the structural cross bow, wherein each track includes a pair of continuous parallel longitudinally extending channels; a panel sized to close the opening; and a set of mechanical linkages disposed in the channels and moveably coupling the panel to the tracks; wherein the panel moves from a closed mode completely overlying the opening to an opened mode partially to wholly uncovering the opening responsive to the set of mechanical linkages moving within the channels unconstrained by the structural cross bow.

The embodiments of the present invention described herein provides a continuous cross sectional profile guide tracks in an outer sliding sunroof where both the front and rear mechanism or mechanism links travel fore/aft in the same channel as each other and have fore/aft travel that is limited only by the vehicle architecture. This guide track channel is partly or entirely outside/outboard of the primary water/wind sealing system of the sunroof.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The present invention eliminates environment seal limitations on hands through and day light opening dimensions while simplifying guide track complexity, assembly requirements, and cost. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method improving sunroof implementations to increase hands through opening and day light opening characteristics. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
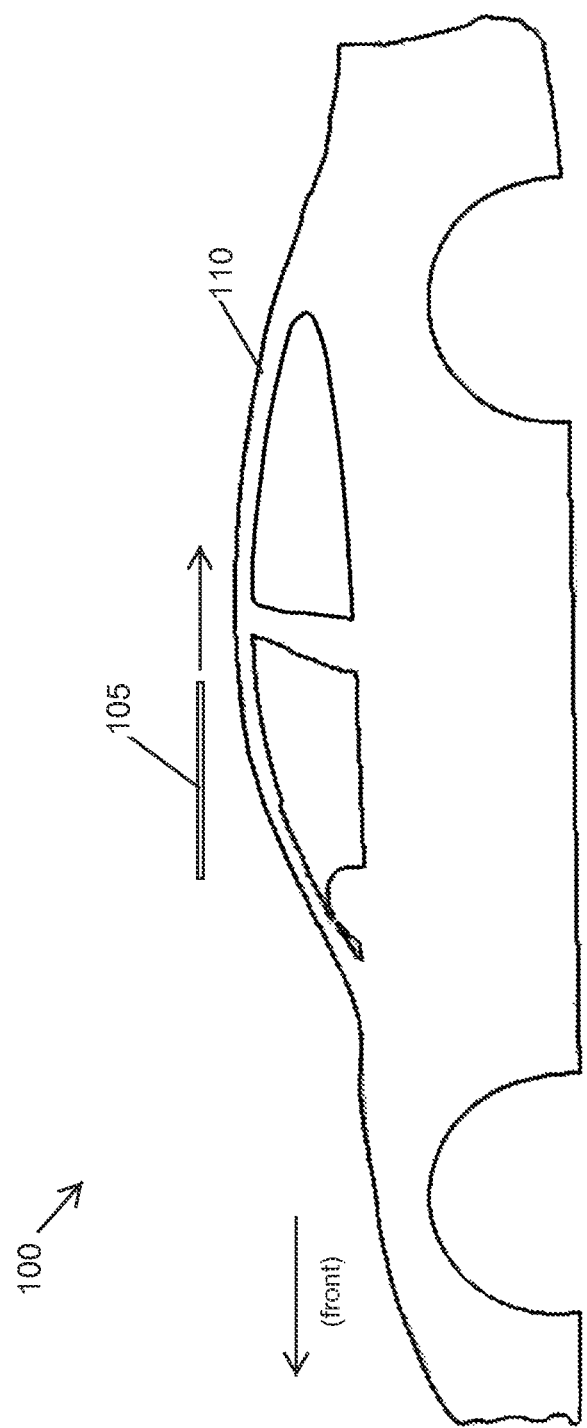
FIG. 1 illustrates a side profile of a vehicle passenger compartment outfitted with in-line outer sliding panorama sunroof tracks.

FIG. 1 illustrates a side profile of a vehicle passenger compartment 100 outfitted with a set of in-line outer sliding panorama sunroof tracks. A sunroof 105 installed in a roof portion 110 of compartment 100 moves fore and aft along the set of tracks. Sunroof 105 is shown schematically above roof portion 110 for ease in visualization but it is understood that it is moveably installed in roof portion 110 as shown and described elsewhere herein.

Figure 2:
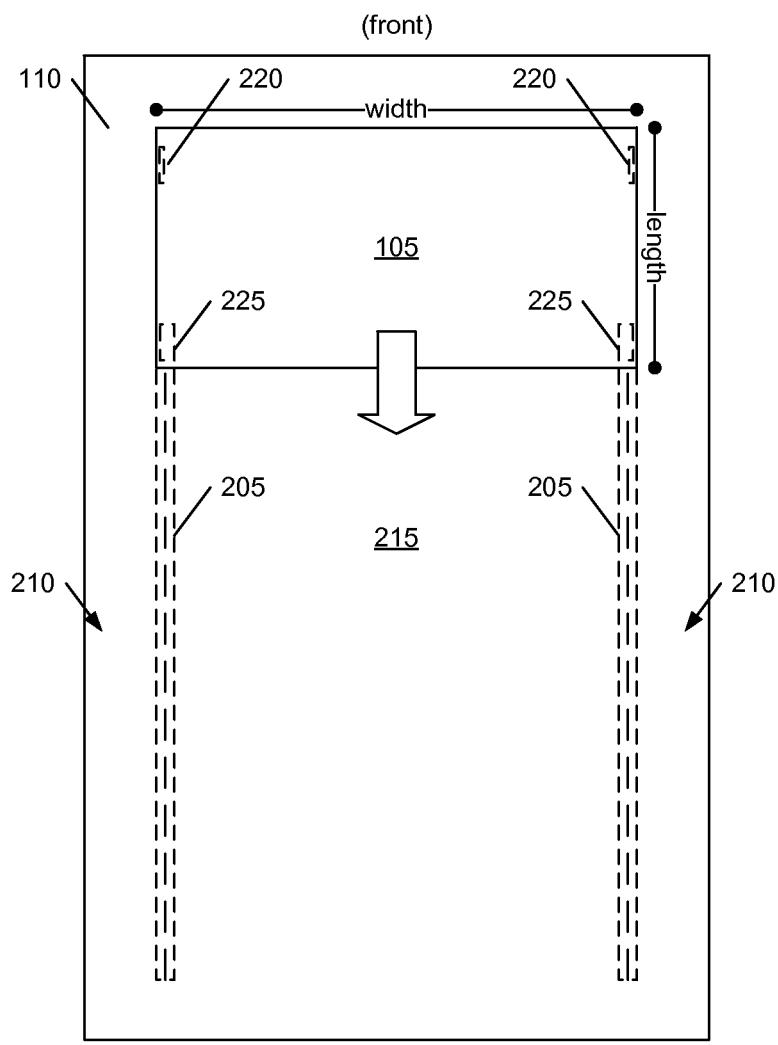
FIG. 2 illustrates a generic representation of a top view of the roof portion of the compartment illustrated in FIG. 1 with the sunroof in the closed mode.

FIG. 2 illustrates a generic schematic representation of a top view of roof portion 110 of compartment 100 illustrated in FIG. 1 with sunroof 105 in a closed mode. A sunroof track 205 is installed at lateral edges 210 of roof portion 110. Sunroof 105 is located above a forward seating area of compartment 100 and moves rearwardly over a region 215 of roof portion 110 when opened. Sunroof 105 provides an aerodynamic profile when closed, and therefore a rear edge of sunroof 105 is in-line with a front edge of region 215. To move rearwardly, sunroof 105 is required to rise up and out of this position when initiating the rearward opening motion to pass over region 215. Further, sunroof 105 drops down and into this position when finishing its closing action. Region 215 may be provided with a fixed moonroof or a solid panel over a rear seating or cargo compartment.

Track 205 is manufactured as a single continuous guiding assembly, such as for example, by an extrusion (e.g., metallic or plastic) process, a roll formation process, a machining process, or the like. Track 205 may be of any length and is installed as a parallel mirror complement to track 205 on an opposing lateral edge 210. The length of track 205 controls how far sunroof 105 may move (i.e., a fore/aft travel distance), which in turn influences a maximum length of sunroof 105. Sunroof 105 may be made longer the further that track 205 runs along lateral edge 210.

Each track 205 includes two parallel guide channels that run its entire length. Sunroof 105 is moveably coupled to these channels using linkage mechanisms that ride in these channels. Sunroof 105 includes a pair of forward linkages 220 (one for each track 205) and a pair of rearward linkages 225 (one for each track 205). In the preferred embodiment, forward linkage 220 and rearward linkage 225 for the same track 205 are disposed in the same physical channel, for example an outermost channel. Additionally, rearward linkage 225 is also disposed in an innermost channel. This enables rearward linkage 225 to independently interact with a lifting/lowering assembly (e.g., a cam or other structure) to lift the rearward edge of sunroof 105 when opening and to lower the rearward edge when closing.

The length of track 205 is affected by an architecture of compartment 100. In conventional systems, a sealing system for sunroof 105 limits the width/length as well as the fore/aft travel distance. In this implementation, the fore/aft travel distance of sunroof 105 is not limited by the sealing system (described later) but rather only limited by architectural demands (for example, a length of roof, a desired head room for the rear seat row(s), an inclusion of a hatchback frame, and a requirement to not continue the travel motion over the backlights or rear window, and the like).

Consequently sunroof 105 is able to achieve significantly larger hands through opening and day light opening sizes than one built with typical construction. Further, these embodiments greatly simplify assembly and manufacturability while allowing reductions in cost because fewer parts are required.

Figure 3:
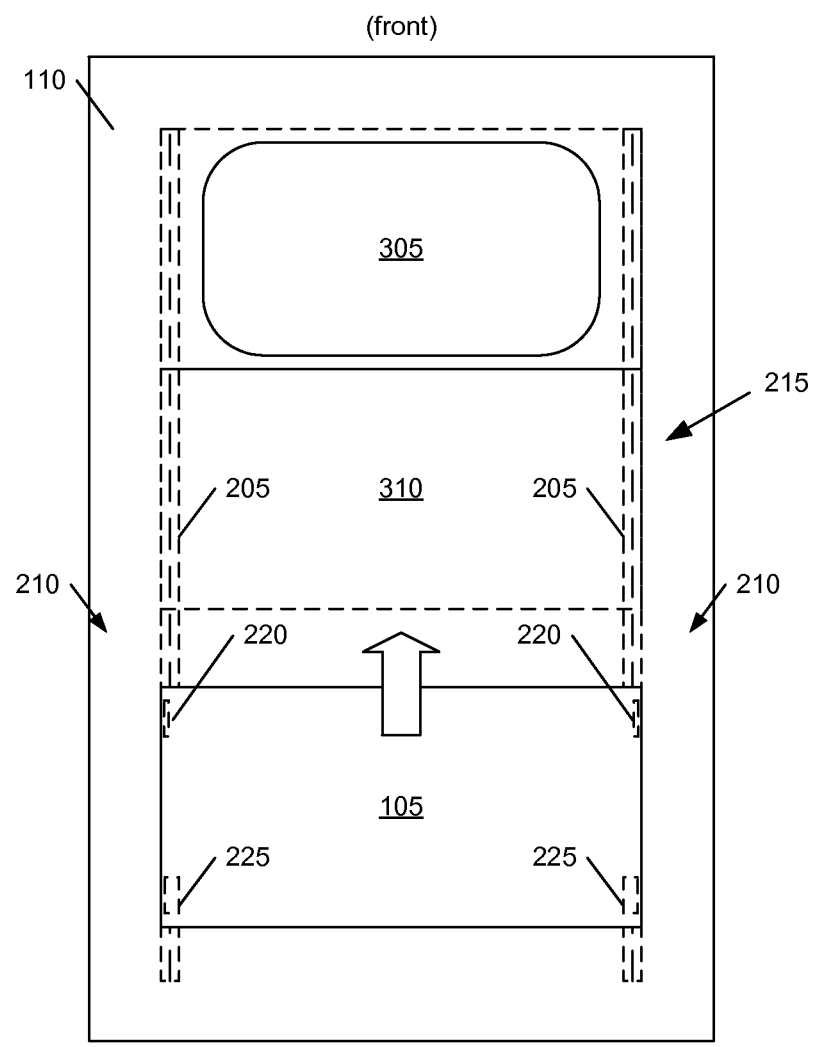
FIG. 3 illustrates the generic representation of FIG. 2 with the sunroof in the open mode.

FIG. 3 illustrates the generic representation of FIG. 2 with sunroof 105 in the open mode. When opened, sunroof 105 reveals a compartment opening 305 that had been previously covered and sealed against the environment. When track 205 is long enough, sunroof 105 may be moved far enough back to uncover enough of region 215 that an optional moonroof 310 in region 215 may be uncovered as well.

Figure 4:
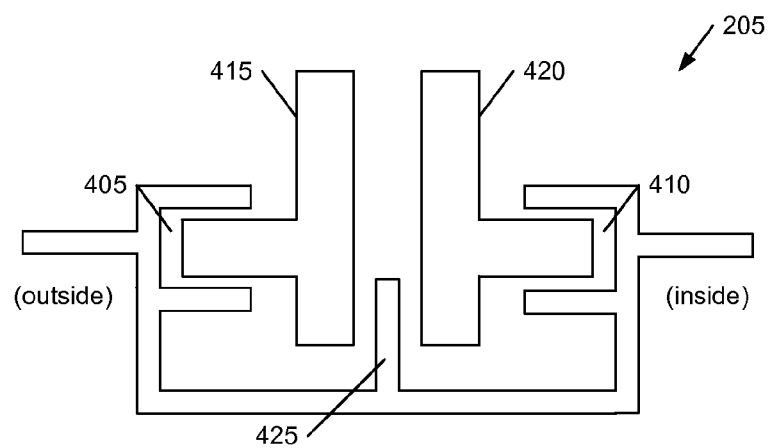
FIG. 4 illustrates a cross-sectional view of a sunroof track.

FIG. 4 illustrates a cross-sectional view of sunroof track 205 as looking from front-to-back of a left-hand-side track 205. Track 205 includes an outer continuous channel 405 and an inner continuous channel 410 rearward of a rear mechanism lifting/lowering cam. A representative outer channel engagement element 415 is duplicated in part of forward linkage 220 and in part of rearward linkage 225. A representative inner channel engagement element 420 is part of rearward linkage 225. A vertical guide rib 425 separates outer continuous channel 405 and inner continuous channel 410. Vertical guide rib 425 provides mechanical support and guidance for structures moving within the channels.

As discussed above, when sunroof 105 is opening, it must lift. This lifting is needed in order to provide clearance above region 215. In order for sunroof 105 to lift, it is actuated by lifting (or cam) elements to do so. These lifting elements are required to act upon both forward linkage 220 and rearward linkage 225. Forward linkage 220 is close to the front of sunroof 105 and when sunroof 105 is closed it is at the very forward end of track 205. Rearward linkage 225, when sunroof 105 is closed resides within track 205. In order to realize an unlimited opening potential, these embodiments provide channel 405 as one continuous guide channel in which both forward linkage 220 and rearward linkage 225 are guided inside. Channel 405 provides these linkages with appropriate mechanical support and guidance over the entire travel length of sunroof 105. These aspects are provided by the guide track design in combination with the design of rearward linkage 225 to initiate lifting when opening, and concluding lowering when closing, sunroof 105 with respect to opening 305.

Figure 5:
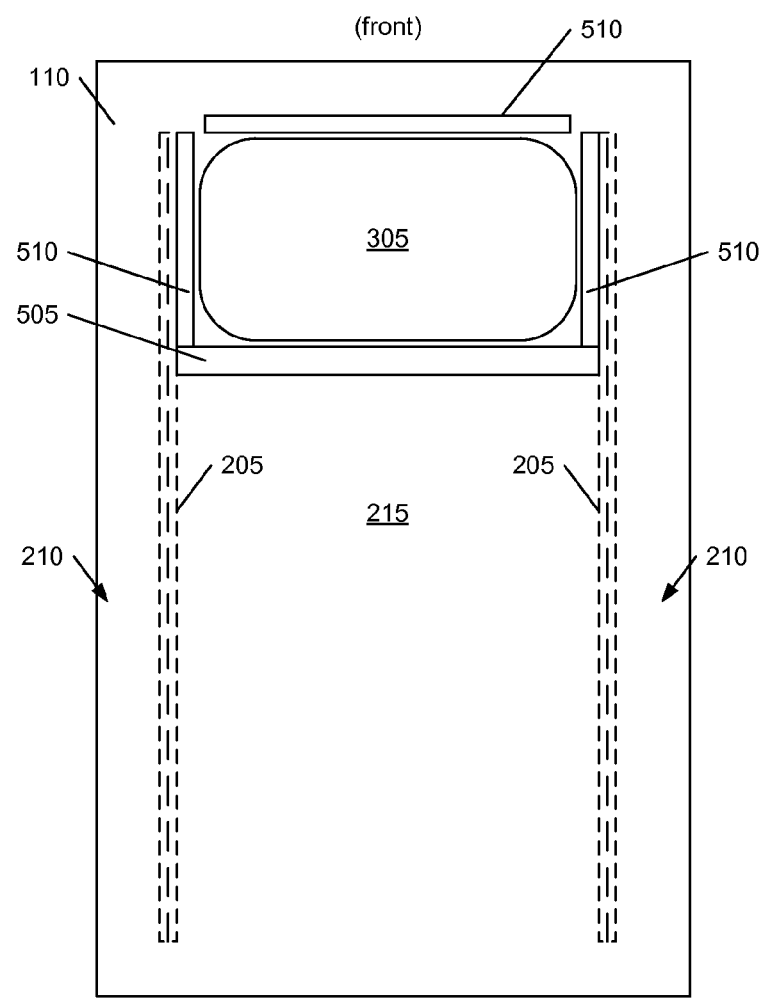
FIG. 5 illustrates the generic representation of FIG. 1 without top panels to reveal a structural cross-bow and sealing surfaces.

FIG. 5 illustrates the generic representation of FIG. 1 without sunroof 105 to reveal a structural cross bow 505 and a sealing surface 510. Cross bow 505 bridges a space of region 215 between tracks 205 without extending over either track 205. Cross bow 505 adds structural stability and strength, enhancing roof crush and side impact performance. Sealing surface 510 includes a compression seal cooperative with sunroof 105 when in the closed mode that provides environmental exclusion. While sealing surfaces are shown along lateral and edges, embodiments of the present invention may change, enhance, and/or remove some or all of the sealing surfaces to meet different performance and operational goals. Environmental components, such as wind noise and liquid elements (e.g., rain), are inhibited from entering opening 305 when sunroof 105 is closed and sealed. This arrangement of cross bow 505 and sealing surface 510 provides channel 405 and channel 410 of track 205 partly/entirely outside of the primary wind/water sealing system of roof portion 110. This, in turn, enables fore/aft travel of sunroof 105 to be limited only by vehicle architecture.

Various embodiments of the present invention have increased performance and operation of sunroof 105 by use of thinner, lighter weight materials than conventional sunroof materials. These materials include various plastics, polymers, and the like are not only thinner and lighter (and may be enhanced with ultraviolet shielding and other environmental protections, but because of the enablement of larger-sized openings, produce a larger-sized sunroof. In some cases, the larger size and the lighter/thinner material can introduce a design issue as sunroof 105 may negatively impact vehicle noise, vibration, and harshness (NVH). Embodiments of the present invention may include a latching system incorporated into sunroof 105 and cross bow 505 (e.g., a "hook" on a rearward edge of sunroof 105 for selective engagement with/ disengagement from a complementary "latch" on a midpoint location of cross bow 505). The latching system helps to reduce NVH factors by securing the trailing edge of sunroof 105 and enhancing any environmental sealing as well. The latching/unlatching is preferably automatic with closing/opening, respectively, sunroof 105.

Preferably a mechanical/electromechanical system is coupled to the linkage mechanisms in order to move them. Movement of the linkage mechanisms operates sunroof 105 to move it between the closed mode and the opened mode. The mechanical/electromechanical system may be motorized or manually operated.

Figure 6:
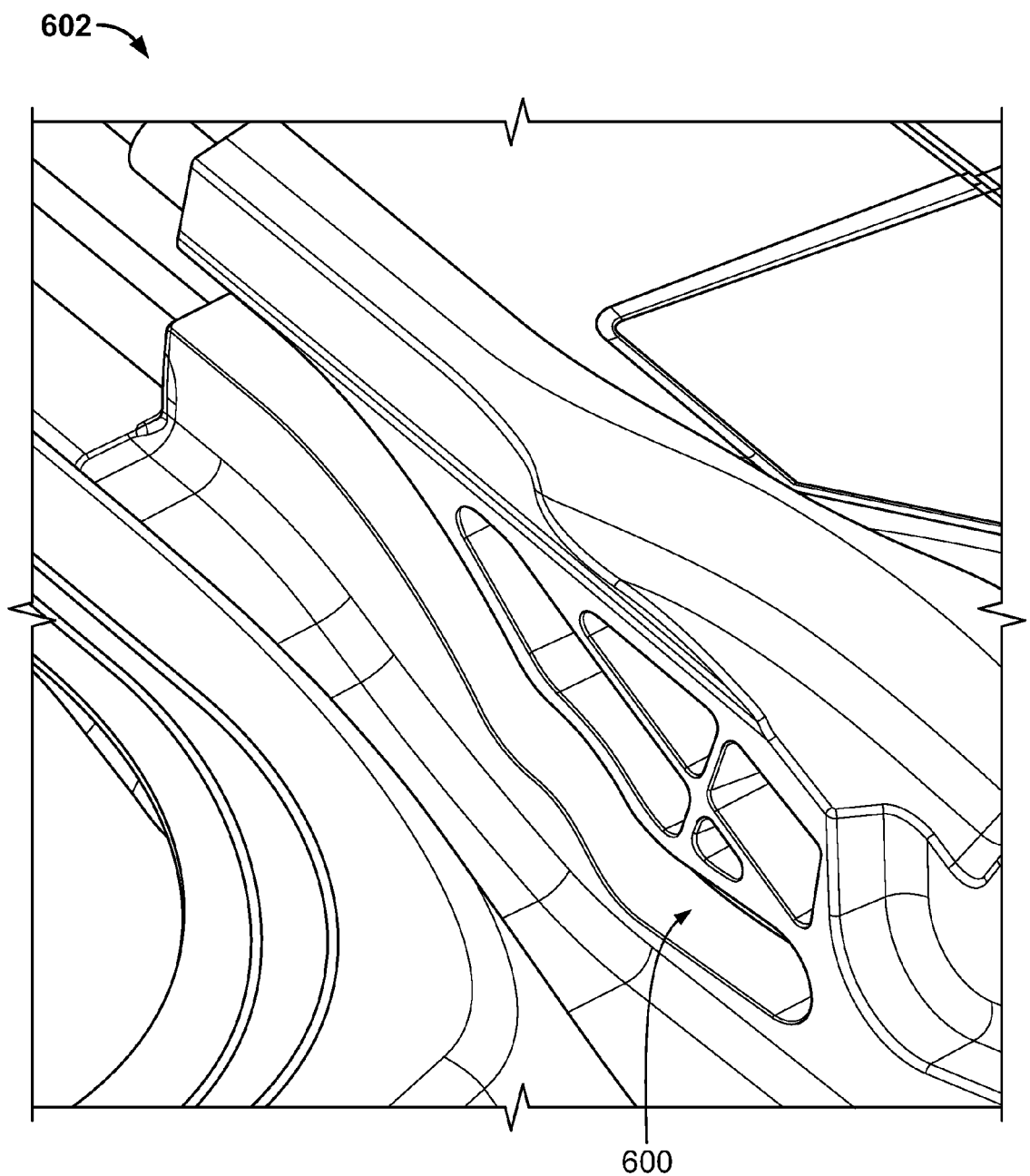
FIG. 6 provides a close-up of a cam slot in a left front corner of a sunroof framework.

FIG. 6 provides a close-up of a cam slot 600 in a left front corner 602 of a sunroof framework. The cam slot of the sunroof mechanism system is integrated directly into the structural elements of the sunroof framework. In a preferred embodiment, the cam slot is integrated into the structural pieces at each of the front corners of the sunroof base frame, left and right sides. The guide shoes of the front mechanism links slide through channels in the guide tracks and directly into the cam slot of this front piece of the framework. As the guide shoes travel through the length of the cam slots, the mechanism links and thus the moving panel is lifted and lowered. The cam slots are molded directly into this injection molded plastic piece of the framework.

Figure 7:
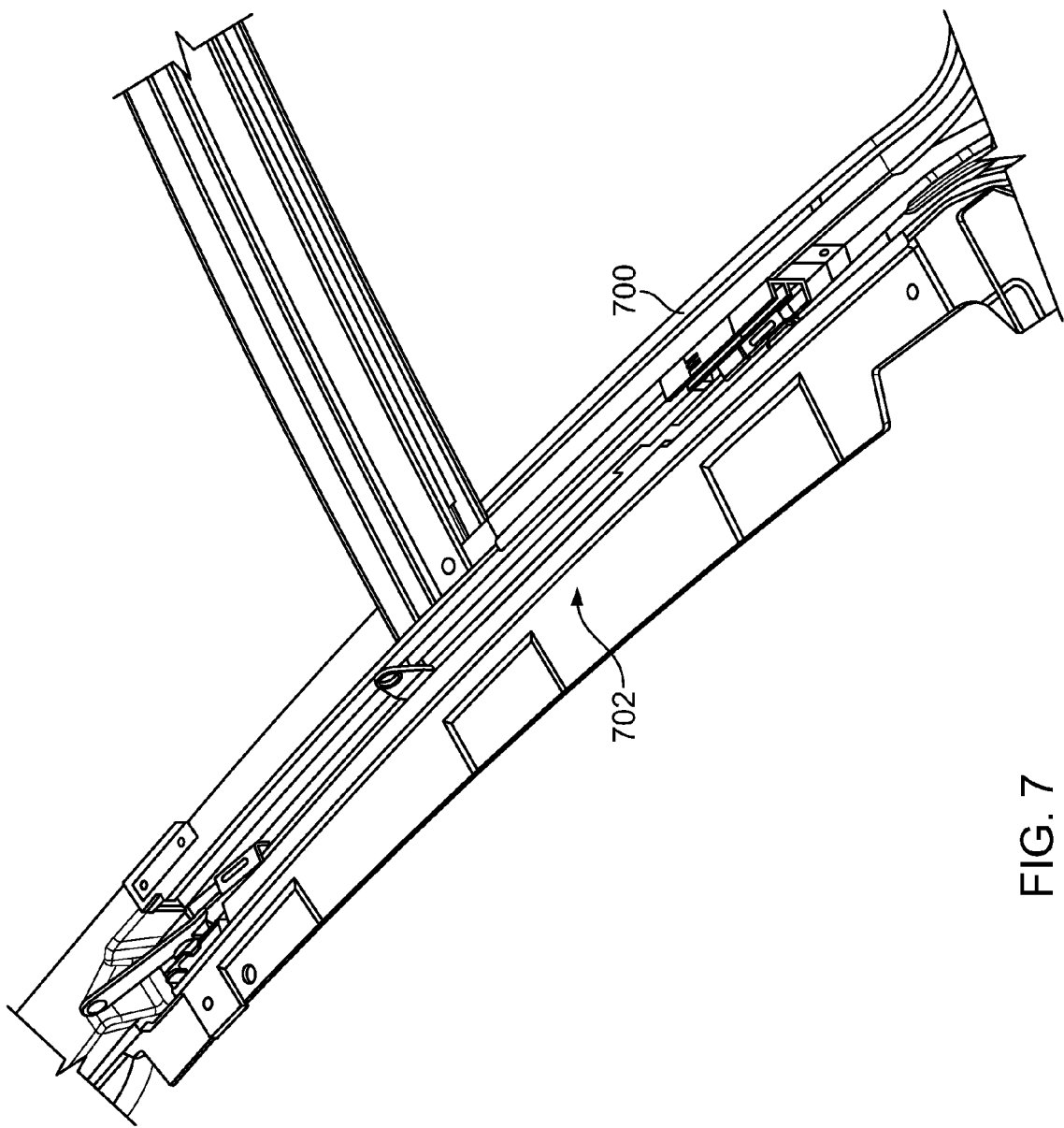
FIG. 7 provides a perspective view of a portion of a sunroof guide track and a structural cross bow.

FIG. 7 provides a perspective view of a portion of a sunroof guide track and a structural cross bow. A primary wind and water seal 700 keeps wind noise and liquid elements (such as rain) away from the occupants and is kept to the inside of guide track channels 702. In combination with this, the structural cross bow which bridges the space between the LH and RH guide track is not extended over the guide track channels. The structural cross bow adds structural stability, thereby enhancing roof crush and side impact performance. Accordingly, the invention is comprised of the two above system level items in combination with the continuous guide track channel design.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A moveable panel system for a roof of a passenger compartment of a vehicle, comprising:
    a roof wall of the vehicle having a first lateral edge and a second lateral edge with said roof wall defining an opening between said lateral edges, said opening having a width between said lateral edges and a length between a front edge of said roof wall and a rear edge of said roof wall;
    a structural cross bow provided in said roof wall perpendicular to said lateral edges and proximate a rear edge of said opening;
    a pair of continuous unitary parallel tracks disposed in said roof wall and longitudinally extending from said front edge towards said rear edge with said tracks outside a perimeter of said opening and outside said structural cross bow, wherein each track includes a pair of continuous parallel longitudinally extending channels;
    a panel sized to close said opening; and
    a set of mechanical linkages disposed in said channels and moveably coupling said panel to said tracks;
    wherein said panel moves from a closed mode overlying said opening to an opened mode partially to wholly uncovering said opening responsive to said set of mechanical linkages moving within said channels;
    wherein said pair of longitudinally extending channels include an outer channel and an inner channel and wherein said set of mechanical linkages include a pair of forward linkages and a pair of rearward linkages; and
    wherein a first forward linkage and a first rearward linkage are coupled to a first lateral edge of said panel, wherein a second forward linkage and a second rearward linkage are coupled to a second lateral edge of said panel opposite of said first lateral edge, wherein said rearward linkages are coupled at said lateral edges closer to a rear edge of said panel than said forward linkages, and wherein all said first linkages are moveably coupled to a particular one channel of a first particular track and all said second linkages are moveably coupled to a particular one channel of a second particular track.

2. The moveable panel system of claim 1 wherein said particular one channels are said outer channels of said particular tracks.

3. The moveable panel system of claim 2 wherein said first rearward linkage is additionally coupled to said inner channel of said first particular track and wherein said second rearward linkage is additionally coupled to said inner channel of said second particular track.

4. The moveable panel system of claim 1 wherein a first environmental seal is disposed between the first particular track and a first lateral edge of said opening and wherein a second environmental seal is disposed between the second particular track and a second lateral edge of said opening.

* * * * *

UNITED STATES PATENT AND TRADEMARK OFFICE
CERTIFICATE OF CORRECTION

| | | |
|---|---|---|
| PATENT NO. | : 8,672,398 B2 | Page 1 of 1 |
| APPLICATION NO. | : 13/628980 | |
| DATED | : March 18, 2014 | |
| INVENTOR(S) | : Gruss et al. | |

It is certified that error appears in the above-identified patent and that said Letters Patent is hereby corrected as shown below:

Title page

Item (72) Inventors list add: Mitchell Stephens, Lexington, Kentucky (US)

Signed and Sealed this
Eighth Day of March, 2016

Michelle K. Lee
*Director of the United States Patent and Trademark Office*